United States Patent
Trif et al.

(10) Patent No.: US 11,024,917 B2
(45) Date of Patent: Jun. 1, 2021

(54) RETAINING ELEMENT FOR USE ON AN ACCUMULATOR, AND ASSOCIATED RETAINING DEVICE

(71) Applicant: Robert Bosch GmbH, Stuttgart (DE)

(72) Inventors: Christian Trif, Dusslingen (DE); Christoph Schumacher, Dusslingen (DE); Frank Hummel, Engstingen (DE); Martin Tenzer, Nuertingen (DE); Volker Jabs, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 16/320,631

(22) PCT Filed: May 12, 2017

(86) PCT No.: PCT/EP2017/061464
§ 371 (c)(1),
(2) Date: Jan. 25, 2019

(87) PCT Pub. No.: WO2018/019441
PCT Pub. Date: Feb. 1, 2018

(65) Prior Publication Data
US 2019/0165347 A1    May 30, 2019

(30) Foreign Application Priority Data
Jul. 28, 2016   (DE) .......................... 102016213903.7

(51) Int. Cl.
*B62M 6/90* (2010.01)
*H01M 50/20* (2021.01)
*F16B 7/22* (2006.01)

(52) U.S. Cl.
CPC .............. *H01M 50/20* (2021.01); *B62M 6/90* (2013.01); *F16B 7/22* (2013.01); *H01M 2220/20* (2013.01)

(58) Field of Classification Search
CPC ..... B60K 1/04; B60K 2001/0455; B62M 6/90
(Continued)

(56) References Cited

U.S. PATENT DOCUMENTS 5,789,898 A * 8/1998 Suzuki ..................... B62M 6/55
                                                        320/104
6,016,882 A * 1/2000 Ishikawa ................ B62K 19/46
                                                        180/207.3
(Continued)

FOREIGN PATENT DOCUMENTS

| DE | 202013008187 U1 | 12/2014 |
| DE | 202014009832 U1 | 6/2015 |

(Continued)

OTHER PUBLICATIONS

International Search Report dated Aug. 3, 2017 of the corresponding International Application PCT/EP2017/061464 filed May 12, 2017.

*Primary Examiner* — Jeffrey J Restifo
(74) *Attorney, Agent, or Firm* — Norton Rose Fulbright US LLP; Gerard Messina

(57) ABSTRACT

A retaining element provided for two-stage fastening to an accumulator or which is part of an accumulator, safeguards against removal from a retaining device. The retaining device is oriented toward the retaining element and is fastened in an interior of tubes of a bicycle frame of an electrically driven bicycle.

17 Claims, 3 Drawing Sheets

(58) Field of Classification Search
USPC .................................................. 180/68.5
See application file for complete search history.

(56) References Cited

U.S. PATENT DOCUMENTS

| | | | | |
|---|---|---|---|---|
| 6,095,270 | A * | 8/2000 | Ishikawa | B62H 5/00 180/220 |
| 6,276,479 | B1 * | 8/2001 | Suzuki | B62M 6/45 180/206.8 |
| 6,423,443 | B1 * | 7/2002 | Tsuboi | B60K 1/04 429/98 |
| 7,117,966 | B2 * | 10/2006 | Kohda | B62K 11/10 180/68.5 |
| 7,934,576 | B2 * | 5/2011 | Munksoe | B62K 11/00 180/220 |
| 8,162,191 | B2 * | 4/2012 | Tetsuka | B62J 11/00 224/459 |
| 8,413,947 | B2 * | 4/2013 | Chiang | B62M 6/90 248/553 |
| 8,651,212 | B2 * | 2/2014 | Vincenz | B62H 5/001 180/205.1 |
| 8,727,367 | B2 * | 5/2014 | Talavasek | B62K 19/30 280/281.1 |
| 8,881,857 | B2 * | 11/2014 | Binggeli | B62M 6/90 180/207.1 |
| 8,893,837 | B2 * | 11/2014 | Kwag | H01R 33/765 180/68.5 |
| 8,979,110 | B2 * | 3/2015 | Talavasek | B62M 6/90 280/279 |
| 8,979,111 | B2 * | 3/2015 | Dal Pozzo | B62J 11/00 280/288.4 |
| 9,159,974 | B2 * | 10/2015 | Kwag | H01M 10/425 |
| 9,302,735 | B2 * | 4/2016 | Tagaya | B62J 11/00 |
| 9,580,141 | B2 * | 2/2017 | Talavasek | B62M 6/40 |
| 9,611,003 | B1 * | 4/2017 | Yu | B62M 6/90 |
| 9,676,443 | B2 * | 6/2017 | Perkins | B62K 19/36 |
| 9,902,457 | B2 * | 2/2018 | Hu | H01M 2/1077 |
| 9,914,501 | B2 * | 3/2018 | Marioni | B60L 3/12 |
| 9,950,602 | B2 * | 4/2018 | Duan | B62M 6/90 |
| 9,969,455 | B2 * | 5/2018 | Kwag | B60L 50/66 |
| 10,131,403 | B2 * | 11/2018 | Elliott | F16D 1/116 |
| 10,183,591 | B2 * | 1/2019 | Shieh | B62M 6/40 |
| 10,319,970 | B2 * | 6/2019 | Sun | A62C 3/07 |
| 10,343,747 | B2 * | 7/2019 | Cunado Landa | B62M 6/40 |
| 10,381,616 | B2 * | 8/2019 | Hsia | B60L 50/66 |
| 10,435,100 | B2 * | 10/2019 | Shimoda | B60R 16/04 |
| 10,442,488 | B2 * | 10/2019 | Kakinoki | G07C 5/0816 |
| 10,511,945 | B2 * | 12/2019 | Masuda | H04W 4/48 |
| 10,518,841 | B2 * | 12/2019 | Talavasek | B62K 19/18 |
| 10,525,839 | B2 * | 1/2020 | Chuang | B60L 50/64 |
| 10,734,687 | B2 * | 8/2020 | Baek | H02J 7/0042 |
| 2004/0013938 | A1 * | 1/2004 | Murashige | H01M 10/443 429/96 |
| 2010/0237585 | A1 * | 9/2010 | Binggeli | B62M 6/90 280/288.4 |
| 2011/0042156 | A1 * | 2/2011 | Vincenz | B62K 19/30 180/206.5 |
| 2012/0313344 | A1 * | 12/2012 | Dal Pozzo | B62J 11/00 280/288.4 |
| 2013/0118825 | A1 * | 5/2013 | Kwag | H01M 2/1077 180/220 |
| 2013/0241169 | A1 * | 9/2013 | Talavasek | B62M 6/90 280/274 |
| 2016/0311494 | A1 * | 10/2016 | Schliewert | B62K 19/30 |
| 2017/0096190 | A1 * | 4/2017 | Yu | B62M 6/90 |

FOREIGN PATENT DOCUMENTS

| | | |
|---|---|---|
| DE | 202015003010 U1 | 6/2015 |
| DE | 102014117827 A1 | 7/2015 |
| EP | 2230164 A1 | 9/2010 |
| EP | 1982909 B1 | 12/2010 |
| EP | 2134592 B1 | 2/2013 |
| EP | 2862791 A1 | 4/2015 |
| JP | H0958563 A | 3/1997 |

* cited by examiner

RETAINING ELEMENT FOR USE ON AN ACCUMULATOR, AND ASSOCIATED RETAINING DEVICE

CROSS-REFERENCE TO RELATED APPLICATIONS

The present application is the national stage of International Pat. App. No. PCT/EP2017/061464 filed May 12, 2017, and claims priority under 35 U.S.C. § 119 to DE 10 2016 213 903.7, filed in the Federal Republic of Germany on Jul. 28, 2016, the content of each of which are incorporated herein by reference in their entireties.

FIELD OF THE INVENTION

The present invention relates to a retaining element for fastening to an accumulator, and which is intended to safeguard against removal from a retaining device, the retaining device which is associated with this retaining element, a retaining unit made up of the retaining element and the retaining device, as well as a bicycle frame inside which at least the retaining device is situated.

BACKGROUND

When electrically operated bicycles are used, the associated energy store, for example an accumulator, is accommodated on the bicycle, preferably without limiting the mobility of the rider. The energy store is generally fastened to the bicycle frame, which is made up of the down tube and seat tube and optionally also the top tube. For the seat tube, there is an option for mounting the energy store in the frame triangle or between the seat tube and the rear wheel, for example in the rear frame triangle. In the latter case, the distance between the pedal crank and the rear wheel axle can possibly increase in order to provide sufficient room for the energy store, which usually occupies a large volume. Another option for accommodating the energy store is to fasten it to the carrier.

The fastening of a battery to the down tube is known from the document EP 2 134 592 B1. For stability reasons, the down tube is designed as a load-carrying, multichamber tube with a cutout for receiving the battery. It is provided that the cutout, which is open at the side, extends into at least one chamber in the multichamber tube, and at least one further chamber is essentially intact.

In addition, a combination of a battery and a bicycle frame is known from EP 1 982 909 B1, in which an upper edge, which is low-cut with respect to the side wall, for creating a recess that is partially open at the side, is provided in one of the tubes of the bicycle frame, and an engaging frame can be inserted into the upper edge. This engaging frame is completely inserted into the recess, so that it can fully enclose the subsequently introduced battery.

An accumulator that is integratable into the bicycle frame is known from the document DE 20 2013 008187 A1. The retaining or contacting takes place via an interface that is separately situated in the frame. The locking takes place via an undercut of the elongated accumulator on a short side opposite from the contacting, so that the accumulator can be partially inserted into the frame.

A retaining element that is provided for receiving, retaining, and locking an accumulator is known from the document DE 20 2014 009832 U1. In addition, a tube element that contains the retaining element is described.

SUMMARY

The present invention concerns a retaining element that is provided for fastening to an accumulator or that is part of an accumulator, and that is intended to safeguard against removal from a retaining device. The present invention also concerns the retaining device, which is oriented toward the retaining element, and a retaining unit made up of the retaining element and the retaining device. Since the use of such a retaining device is provided for a bicycle that is in particular electrically driven, the present invention also concerns a bicycle frame in which the retaining device is fastened in one of the tubes in the interior used for this purpose.

According to an example embodiment of the present invention, the retaining element includes a first side with a fastener for fastening to a (bicycle) accumulator. This fastener can be designed as a plug-in element and/or screwing element. On the second side opposite from the first side, the retaining element includes a blocking element and a first stop with which an external locking bar can engage. This external locking bar is part of a retaining device that is provided on the receptacle of the retaining element. The blocking element of the retaining element includes a hook and/or a locking bolt that leads away from the second side and is used for engaging with a second stop that is provided in the retaining device. In addition, the blocking element has an elastic effect that is oriented perpendicularly with respect to the second side, i.e., in a horizontal direction.

With the design of this type of retaining element or an accumulator that includes this type of retaining element, fastening of the retaining element or the accumulator in a retaining device can be achieved in which two independently situated stops or engagement means prevent removal from the retaining device.

The blocking element is preferably mounted on the retaining element in the edge area of the second side and designed as a leaf spring in the direction of the center of the second side. Alternatively, the blocking element can also include a first spring via which the blocking element is held under tension, spaced apart from the second side. The blocking element can be situated in such a way that a first spring that is provided for producing this tension is situated in the edge area of the second side of the retaining element. The blocking element can optionally extend across at least one-half of the second side and can be rotatably supported.

For flat coverage of at least one side of the accumulator, the retaining element can be adapted to the shape of the side of the accumulator to which it is fastened. For fastening, a, in particular, centrally situated elevation or depression can be provided which can be inserted into a corresponding opening on the fastening side of the accumulator. Of course, two or more elevations and/or depressions can also be provided distributed over the surface of the retaining element. Alternatively or additionally, it can also be provided that the retaining element can be screwed onto the accumulator. For this purpose, one or multiple threads are provided which run circumferentially, at least in part. Of course, it can also be provided that the thread is provided on the elevation and/or in the depression.

The retaining device, which is structurally oriented toward the retaining element and/or an accumulator that is provided with the retaining element, includes a displaceable locking bar that can be brought into a locked and an unlocked position. For this purpose, the locking bar includes at least one locking bar subelement that has a horizontal motion component with respect to the second side of the retaining element. In the locked position of the locking bar, the locking bar subelement is displaced in such a way that it engages with the first stop of the retaining element that is inserted into the retaining device. The locking bar subelement can produce a mechanical contact with the first stop, which generates a downward force in the vertical direction and thus presses the retaining element and/or the accumulator connected to the retaining element downwardly. However, it is important that the engagement of the locking bar subelement with the first stop prevents the retaining element and/or accumulator connected to the retaining element from being able to move upwardly, resulting in a locking situation at least in the vertical direction. In contrast, in the unlocked position of the locking bar, the movement of the retaining element or of the accumulator connected thereto in the vertical direction, i.e., upwardly, is at least partially enabled. In addition, the retaining device includes a second stop against which the blocking element of the retaining element can strike in the vertical direction, at least in the event that the blocking element has not been pressed back against its elastic effect. This second stop of the retaining device is preferably provided spaced apart, in the vertical direction, from the blocking element of the retaining element, which is introduced into the retaining device.

Thus, with the design of this retaining device, two-stage retention of the retaining element or of the accumulator connected thereto is achieved, in that a second stop prevents removal after unlocking.

In an example embodiment, the locking bar of the retaining device lifts the retaining element and/or the accumulator connected to the retaining element in the vertical direction, at least in the area of the retaining device. This can take place, for example, in that, when it is unlocked, the locking bar is connected to the retaining element in such a way that it presses the retaining element upwardly. Alternatively, it can be provided that the retaining device includes a second spring that is compressed in the locked position due to the insertion of the retaining element and/or an accumulator connected to the retaining element. When the locking bar is unlocked, this tensioned second spring then produces an upward movement of the retaining element or of the accumulator connected thereto, i.e., in the vertical direction. To lift at least one end of the accumulator, it can be provided that the second spring is situated in the lower area of the retaining device. Of course, it can also be provided that the spring is electrically controllable, so that tension and relaxation of tension can be controlled. For the case that the retaining device is used in a top tube or down tube which includes the receptacle for the accumulator facing downwardly toward the roadway, the spring can be dispensed with, since the force of gravity effectuates the movement to the second locking position.

The lifting of the retaining element or of the accumulator connected thereto on at least the side of the accumulator facing the retaining device allows the blocking element to at least partially protrude beyond the upper edge of the retaining device when the associated lift in the vertical direction is suitably selected. For the case that the accumulator is inserted and removed in a top tube or down tube, the upper edge of the retaining device or of the top tube can also point downwardly toward the roadway. As a result of this lift, the intent is for the blocking element to be reachable from the outside in such a way that the blocking element can be compressed. Due to the compression of the blocking element against its elastic effect, the hook that is present on the blocking element can be removed from the second stop on the retaining device, so that the retaining element or the accumulator thus connected thereto is released from the retaining device. It is thus possible to remove the accumulator.

An example embodiment of the present invention relates to the retaining element or the accumulator connected thereto in a receptacle of the retaining device. For this purpose, an electrical contact is provided, in particular in the lower area of the retaining device, that detects a mechanical resting by the retaining element or the accumulator. As a result of this electrical contact, it can be recognized whether the accumulator correctly rests in the receptacle of the retaining device, in particular in the locked position. Alternatively, an electrical contact can also be used to detect whether the locking bar is in the locked position.

The locking bar of the retaining device can be rotatably supported so that the locking bar subelement can be pressed from above onto the first stop of the retaining element. In addition, the locking bar can be part of a lock.

As stated above, the retaining device can be provided for mounting in the interior of a tube of a bicycle frame. For this purpose, it is advantageous when the retaining device includes corresponding fasteners with which an exchange is possible, for example to retain other accumulators with other retaining systems. The described two-stage retaining and removal system is particularly advantageous for the case that the associated accumulator is to be introduced from the side or from below into a tube of the bicycle frame. The accumulator is thus prevented from falling out during unlocking by a lock, in that the accumulator moves only to the second stop, and a further unlocking operation is necessary.

The retaining element and the retaining device can each be provided with a beveled design so that guiding during insertion from above can be achieved.

The top tube and down tube of a bicycle are one example of a typical use of the devices according to the present invention. For this purpose, a receptacle is provided in the particular tube via an indentation in the surface of the tube, in which the accumulator can be at least partially accommodated. The retaining device is mounted on one end in the interior of the receptacle.

It is expressly pointed out that the terms "top" and "bottom" in the present discussion refer to the receiving or removal of the accumulator with respect to the base of the tube. Accordingly, the present invention can be utilized with a top tube or down tube to remove the accumulator from the receptacle of the tube downward, with regard to the customary use of a bicycle frame, relative to the roadway.

Further advantages result from the following description of exemplary embodiments, and from the claims.

DETAILED DESCRIPTION

During operation of electrically drivable two-wheeled vehicles, such as electric bicycles in particular, accommodating energy stores is an important requirement. Thus, it is known to accommodate energy stores such as accumulators or batteries on or at the carrier. However, in the majority of electric bicycles, the energy store is mounted in the frame triangle or behind the seat tube. However, this type of mounting reduces the storage space that is available in the frame triangle for some other use, such as a lock, bottle holder, and/or a container for a tire repair kit. Therefore, efforts have been made to integrate the energy stores directly into the frame, for example in the down tube or the top tube.

In the use of energy stores that are integrated into bicycle frames, a suitable retaining system is provided, as described in DE 20 2014 009732 U1, for example. With the retaining system according to example embodiments of the present invention, a two-stage release of the energy store is described in which the unlocking by a key still does not allow the final removal of the energy store from the retaining system or the bicycle frame. Removal is possible only by actuating a second locking mechanism. As a result of this two-stage removal, the energy store cannot inadvertently fall out of the receptacle of the bicycle frame when the lock has already been released with the aid of the locking mechanism. Thus, for example, an accumulator can be accommodated in the top tube from the bottom side, without the risk of the accumulator immediately falling out when the lock is unlocked.

Figure 1A:
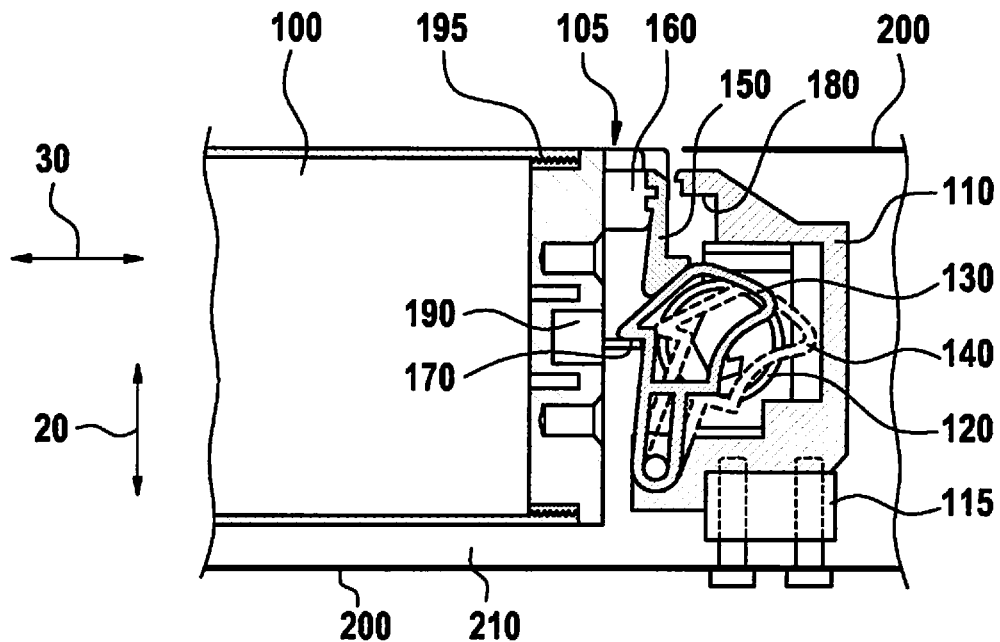
FIGS. 1a and 1b illustrate the first retaining element according to example embodiments of the present invention.

FIG. 1a illustrates a first exemplary embodiment for retaining element 105 and an accumulator 100 connected thereto, as well as retaining device 110 associated with retaining element 105. Retaining element 105 is equipped with at least one fastener 190 or 195 on a first side, with the aid of which fastening to accumulator 100 is made possible. This can be, for example, at least one elevation 190 that can be inserted into a corresponding depression on a (longitudinal) side of accumulator 100. One or more depressions can also be provided which can be inserted into a corresponding elevation. Alternatively or additionally, a thread 195 can be provided that runs circumferentially, at least in part, for example also in the depression or on the elevation.

Retaining device 110 includes a locking bar 130 or 140 that can assume at least two different positions. In locked position 130, a hook that is situated on the locking bar presses onto a first stop 170 of retaining element 105, which is situated on a second side provided opposite from the first (fastening) side. The freedom of movement of retaining element 105 or of accumulator 100 connected thereto is limited upwardly 10 in vertical direction 20 by this locked position 130 of the locking bar. The locking bar 130 can be designed in such a way that it undergoes a rotational movement, for example as a function of actuating a lock 120 that is connected to locking bar 130, as the result of which the hook exerts a downward force on first stop 170 in order to hold retaining element 105 or accumulator 100 connected thereto in a first locking position in a retainer provided for this purpose. When the locking bar is unlocked, it is in position 140, so that the hook no longer rests against first stop 170, which thus allows at least a partial movement of retaining element 105 or of accumulator 100 connected thereto upwardly 10 in the vertical direction. However, in the cooperation of a hook of a blocking element 150, which is situated on retaining element 105 and points away from the second side, with a second stop 180 on retaining device 110, this upwardly 10 vertical movement is limited, in particular in a second locking position. The extent of the upward movement in the vertical direction is specified by the distance between the hook of blocking element 150 and second stop 180. This lift, specified by the system, likewise represents a measure for the movement with which retaining element 105 or accumulator 100 rises beyond the upper edge of the retaining device or a (frame) tube 200 in which the retaining device is situated. Blocking element 150 is situated in such a way that when retaining element 105 lifts, the blocking element is raised at least enough so that it is accessible from the outside. Use is made of this accessibility in the following discussion so that a spring suspension with which blocking element 150 is equipped can be compressed, so that the hook connected thereto no longer rests against second stop 180. Due to this pressing back of blocking element 150, in particular in the horizontal direction, retaining element 150 or accumulator 100 connected thereto can be removed.

The thus achieved two-stage removal of an accumulator 100, equipped with retaining element 105 of the present invention, from a retaining device 110 thus prevents accumulator 100 from inadvertently falling out of receptacle 210 after unlocking with the aid of a lock 120. This is particularly advantageous when the system according to the present invention is used overhead, for example in a top tube or down tube of a bicycle frame with access from below, relative to the roadway.

Blocking element 150 can be designed as a leaf spring for achieving the elastic effect. To obtain access to this leaf spring when retaining element 105 protrudes beyond retaining device 110 or the surface of the frame tube, blocking element 150 must be situated at the edge of retaining element 105 in such a way that external access allows the leaf spring to be compressed.

Alternatively, a spring 160 that is situated at the edge of retaining element 105 and released for access by lifting retaining element 105 can be associated with blocking element 150. Entire blocking element 150 can thus be compressed in horizontal direction 30, so that the mechanical stop of the corresponding hook on second stop 180 is overcome.

A special fastener 115 is provided for fastening retaining device 110 in the interior of a tube 200 of the bicycle frame. This fastener can be provided to be detachable or nondetachable. The detachable variant has the advantage that a retaining element that is provided for a different accumulator system can be used by exchanging the structurally oriented retaining device that corresponds to this other retaining element. In both cases, the fastening can take place from outside of tube 200 or also from within. Of course, a combination of both types of fastenings can also be provided.

Figure 1B:
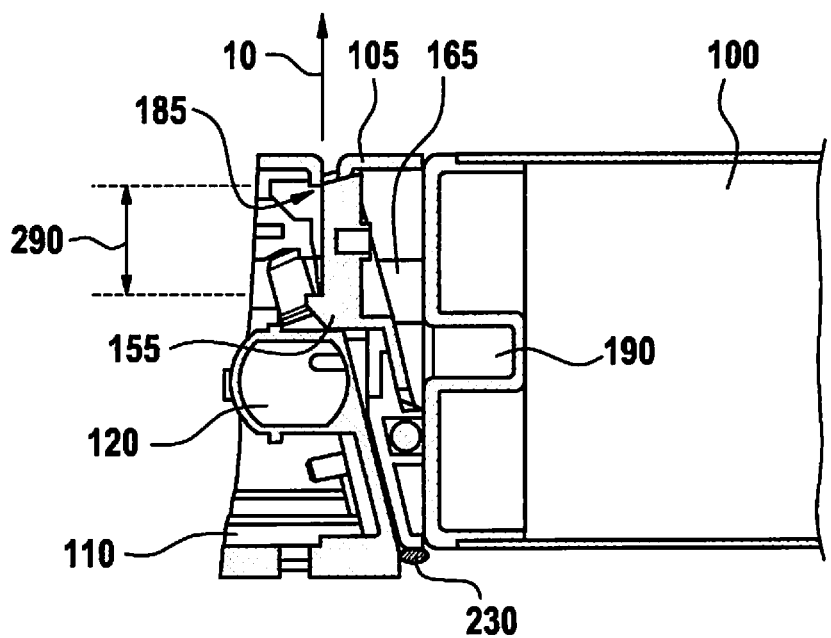

A second exemplary embodiment according to FIG. 1b shows another option for implementing blocking element 155. As in the first exemplary embodiment, a locking bar is provided which is connected to a lock 120 and which can assume at least one locked position and one unlocked position. However, the locking bar is not depicted in FIG. 1b for explanation of the exemplary embodiment. In this exemplary embodiment, blocking element 155 has a rotatable design, in that the point of rotation is provided in the lower, one half, and spring 165 is provided in the upper, other half, of retaining element 105. Blocking element 155 is pressed away from accumulator 100 by this spring 165, so that the hook of blocking element 155 points away from accumulator 100 and thus away from retaining element 105, in particular in the horizontal direction. The hook of blocking element 155, and stop 185 of retaining device 120, which is situated above the hook in particular in the vertical direction, have a lift 290 by which retaining element 105 or accumulator 100 connected thereto can move upwardly 10 in the vertical direction before the lift is hindered from further movement in the untensioned state of blocking element 155.

This lift 290 is sufficient to raise retaining element 105 and in particular accumulator 100 connected thereto far enough upwardly 10 that access to blocking element, 155 which is pressed out with the aid of spring 165, is possible. By pushing back blocking element 155 or spring 165, the hook can be pressed far enough in the direction of accumulator 100 that it moves past stop 185 and thus completely releases the accumulator for removal.

In an example embodiment of the present invention, the insertion of accumulator 100 into receptacle 210 of tube 200 is checked with the aid of an electrical contact 230. For this purpose, a check is made concerning the extent to which accumulator 100 rests on the base of tube 200 or on a carrier associated with retaining device 120. In this first locking position, accumulator 100 is locked and usable for operation. In contrast, if it is determined that accumulator 100 is in the second locking position, for example due to the hook of the blocking element resting against the second stop, a warning to the user can be made as a function of the electrical contact. The first locking position can be detected via mechanical resting of the accumulator on a sensor 230. It is advantageous to situate associated sensor 230 in the lower area of retaining device 120, in the area of the highest lift between the first and the second locking position.

Figure 2A:
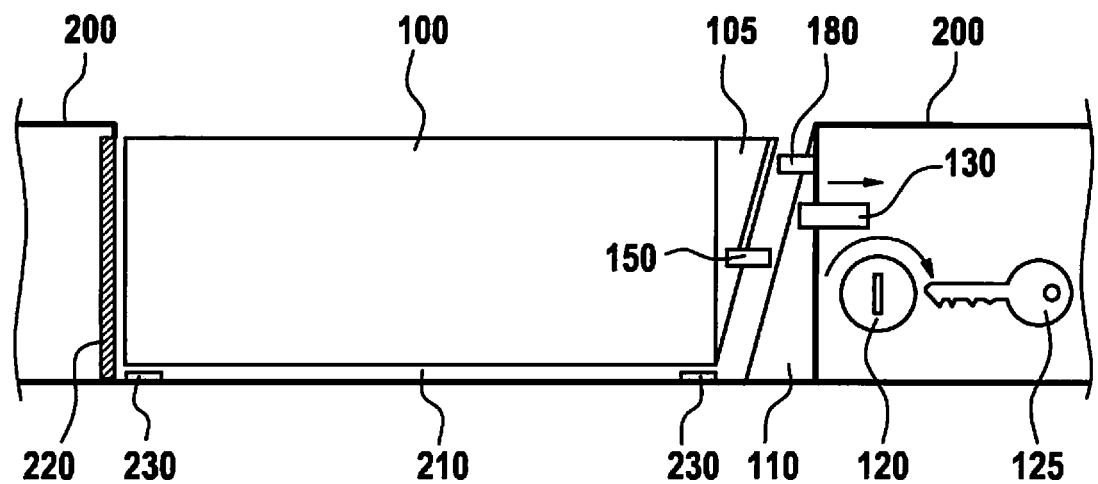
FIGS. 2a and 2b illustrate an operating principle of the retaining device, according to an example embodiment of the present invention.
Figure 2B:
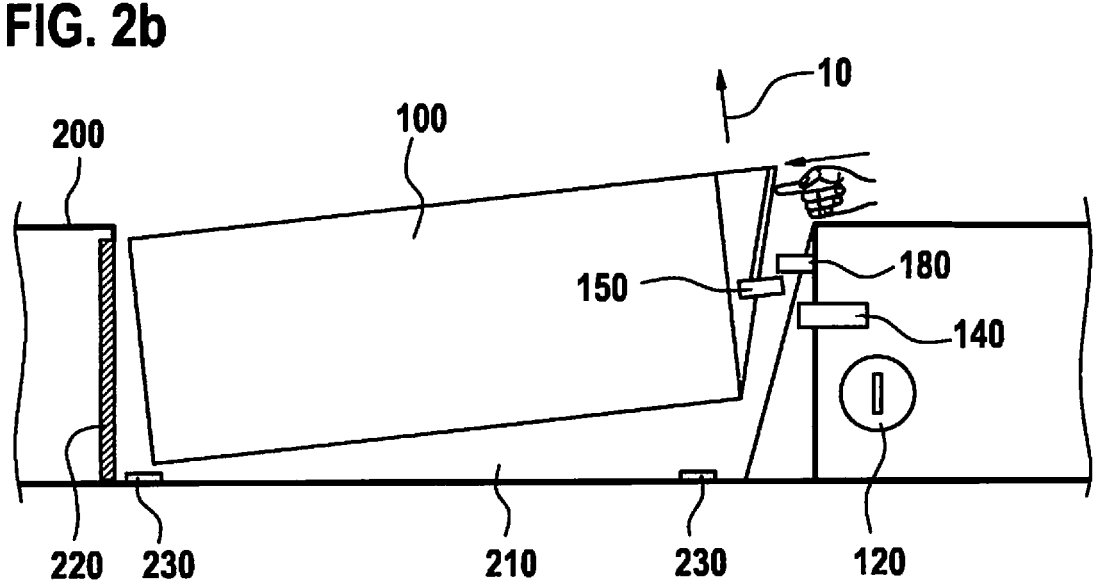

FIGS. 2a and 2b illustrate another schematic exemplary embodiment of the present invention. In this exemplary embodiment, it is shown that accumulator 100 can be accommodated in a trough as a receptacle 210 within a tube 200 of a bicycle frame. The surface of accumulator 100 or a cover fastened to the surface terminates essentially with the surface of tube 200. Locking bar 130, in addition to the form previously illustrated, can also be designed as a locking bar element that is displaceable in the horizontal direction and that can be moved back and forth by a lock 120 and a key 125 connected thereto. Blocking element 150 of retaining element 105, which is fastened to accumulator 100, in turn strikes against second stop 180 without a separate actuation, and thus prevents removal of accumulator 100 from receptacle 210. This release of accumulator 100, which is connected to retaining element 105 in this way, is possible only when blocking element 150 or a portion of retaining element 105 is pressed back.

Figure 3:
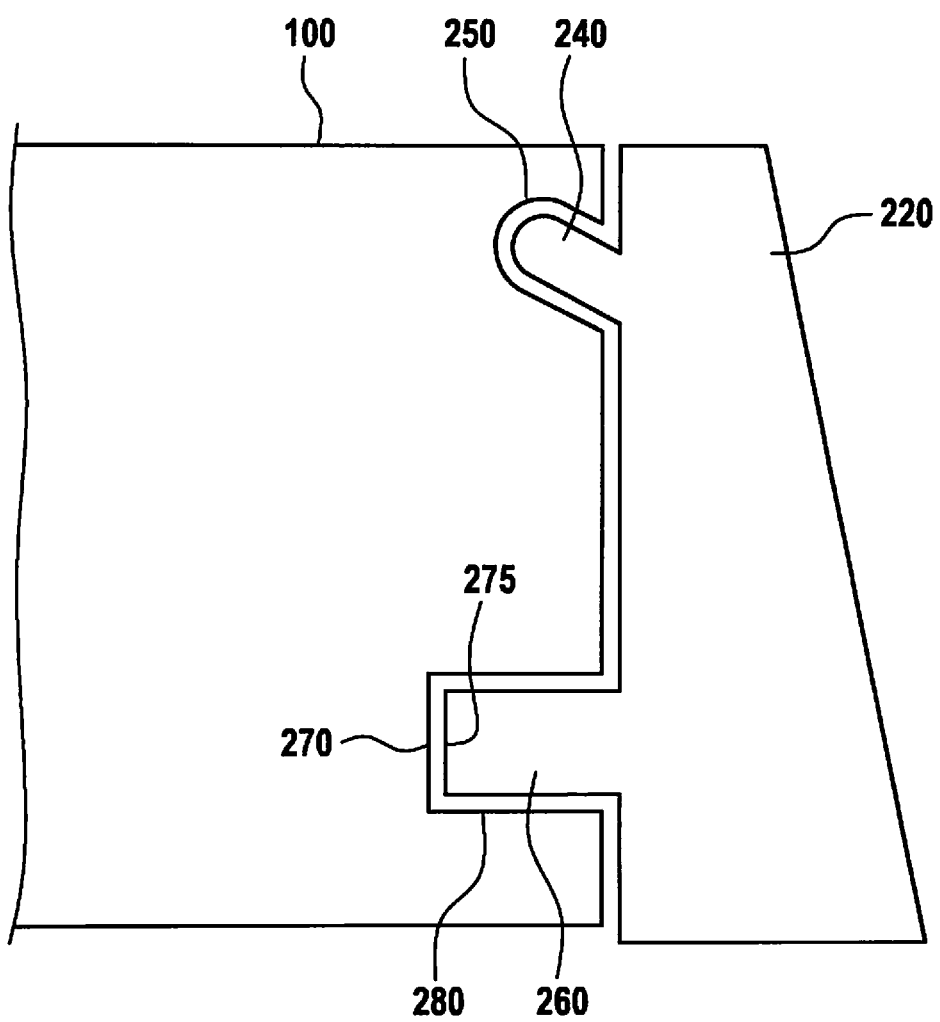
FIG. 3 shows a contacting device of a retaining device according to an example embodiment of the present invention.

For contacting accumulator 100, a contacting device 220 can be situated in tube 200 at the end of receptacle 210, opposite from retaining device 110. This is used, among other things, as a counterelement for the clamping forces from locking bar 130 or blocking element 150 or 155. In addition, second retaining element 220 can have further features that take over the retention of accumulator 100 in receptacle 210 as well as its electrical contacting, as shown in FIG. 3 by way of example. Provided in second retaining element 220 is a corresponding contact 260 that includes contact surfaces 275, for example in the form of plugs/sockets that can be connected to corresponding contact surfaces 270, for example sockets/plugs, of accumulator 100 in order to establish electrical contact. Contact surfaces 270 of accumulator 100 are generally accommodated in a depression 280 in order to protect them. Additionally or optionally, second retaining element 220 can include a molding 240 that fits into a corresponding recess 250 of accumulator 100. A guided, rotationally supported movement of accumulator 100 during introduction into receptacle 210 can be achieved with such a molding, for example a peg. As a result of this guidance, joining the contact surface, and thus establishing the electrical connection, can advantageously be achieved.

As mentioned above, one or multiple electrical contacts 230 can be provided which detect the insertion of the accumulator into receptacle 210. For this purpose, at least one electrical contact 230 is provided in the area of retaining element 110. However, some other electrical contact 230 can be provided that is situated at the other end of receptacle 210 in the area of contacting device 220. Electrical contact 230 can be mounted on the base of the receptacle, independently of the retaining element, the retaining device, and/or the contacting device. Alternatively, it is also possible for retaining device 110 and contacting device 220 to be connected with the aid of a shared carrier on which accumulator 100 rests and in which at least one electrical contact 230 is accommodated.

What is claimed is:

1. A retaining element for fastening to an accumulator, comprising:
 a first side having at least one fastener for fastening to the accumulator; and
 a second side that is opposite the first side, wherein the second side includes a first stop for engaging with a locking bar of a retaining device, and a blocking element, wherein the blocking element includes a hook leading away from the second side for engaging with a second stop of the retaining device, and has an elastic effect toward the second side;
 wherein the retaining device includes:
  a displaceable locking bar having a horizontal motion component that is directed toward the second side of the retaining element, wherein the retaining device is configured to shift between a locked position, in which the locking bar engages with the first stop so that vertical movement of at least one of the retaining element and the accumulator connected to the retaining element is hindered, and an unlocked position, in which the at least one of the retaining element and the accumulator is movable in the vertical direction; and
  a second stop for engaging with the blocking element to thereby limit the vertical movement, in the unlocked position, to end at the second stop.

2. The retaining element of claim 1, wherein the blocking element is mounted in an edge area of the second side and includes a leaf spring in the direction of the center of the second side.

3. The retaining element of claim 1, wherein the blocking element includes a first spring that is mounted in an edge area of the second side.

4. The retaining element of claim 1, wherein the fastener includes either or both of: (a) an at least partially circumferentially running thread, and (b) a centrally situated elevation or depression.

5. A device, comprising:
 an accumulator; and
 a retaining element that includes a first side that includes at least one fastener by which the retaining element is fastened to the accumulator and a second side that is opposite the first side, wherein the second side includes: a first stop for engaging with a locking bar of a retaining device, and a blocking element that includes a hook leading away from the second side for engaging with a second stop of the retaining device, and has an elastic effect toward the second side;
 wherein the retaining device includes:
  a displaceable locking bar having a horizontal motion component that is directed toward the second side of the retaining element, wherein the retaining device is configured to shift between a locked position, in which the locking bar engages with the first stop so that vertical movement of at least one of the retaining element and the accumulator connected to the retaining element is hindered, and an unlocked position, in which the at least one of the retaining element and the accumulator is movable in the vertical direction; and a second stop for engaging with the blocking element to thereby limit the vertical movement, in the unlocked position, to end at the second stop.

6. A retaining device for retaining at least one of a retaining element and an accumulator at least in a vertical direction, the retaining element including a first side having at least one fastener by which the retaining element is fastened to the accumulator, and a second side that is opposite the first side, comprising:

a displaceable locking bar having a horizontal motion component that is directed toward the second side of the retaining element when the retaining element is inserted into the retaining device; wherein the displaceable locking bar is configured to shift between a locked position, in which the locking bar engages with a first stop of the second side of the retaining element, so that vertical movement of the at least one of the retaining element and the accumulator connected to the retaining element is hindered, and an unlocked position, in which the at least one of the retaining element and the accumulator is movable in the vertical direction; and a second stop for engaging with a blocking element of the second side of the retaining element, so as to limit the vertical movement, in the unlocked position, to end at the second stop.

7. The retaining device of claim 6, wherein the locking bar, in the unlocked position, is configured for lifting the at least one of the retaining element and the accumulator connected to the retaining element, at least locally, in the vertical direction in an area of the retaining element.

8. The retaining device of claim 7, wherein the lifting is high enough that the blocking element is raised, at least partially, beyond an upper edge of the retaining device.

9. The retaining device of claim 6, further comprising:
a spring, in a lower area of the retaining device, that is tensioned when the accumulator is locked by the locking bar and is relaxed in the unlocked position of the locking bar, by which the at least one of the retaining element and the accumulator connected to the retaining element is lifted, at least locally, in the vertical direction in an area of the retaining element.

10. The retaining device of claim 6, further comprising:
an electrical contact, in a lower area of the retaining device, that detects an insertion and a mechanical resting of at least one of the retaining element and the accumulator connected to the retaining element in the locked position.

11. The retaining device of claim 6, wherein the locking bar is rotatably supported.

12. The retaining device of claim 6, wherein the locking bar is mechanically connected to a lock.

13. A retaining unit, comprising:
a retaining element; and
a retaining device in which the retaining element is inserted;
wherein the retaining element includes:
a first side having at least one fastener for fastening to an accumulator; and
a second side that is opposite the first side, wherein the second side includes a first stop for engaging with a locking bar of a retaining device, and a blocking element that includes a hook leading away from the second side for engaging with a second stop of the retaining device, and that has an elastic effect toward the second side; and
wherein the retaining device includes:
a displaceable locking bar having a horizontal motion component that is directed toward the second side of the retaining element, wherein the retaining device is configured to shift between a locked position, in which the locking bar engages with the first stop so that vertical movement of at least one of the retaining element and the accumulator connected to the retaining element is hindered, and an unlocked position, in which the at least one of the retaining element and the accumulator is movable in the vertical direction; and
a second stop for engaging with the blocking element to thereby limit the vertical movement, in the unlocked position, to end at the second stop.

14. The retaining unit of claim 13, wherein the retaining element is removable from the retaining device by, while in the unlocked position, pressing the elastic blocking element out of the retaining device.

15. A bicycle frame, comprising:
tubes; and
a retaining device, detachably fastened in an interior of one of the tubes, for retaining at least one of a retaining element and an accumulator at least in the vertical direction;
wherein the retaining element includes a first side that includes at least one fastener by which the retaining element is fastened to the accumulator, and a second side that is opposite the first side;
wherein the retaining device includes a displaceable locking bar, which includes a horizontal motion component that is directed toward the second side of the retaining element when the retaining element is inserted into the retaining device, wherein the displaceable locking bar is configured to shift between a locked position, in which the locking bar engages with a first stop, which is of the second side of the retaining element, so that vertical movement of the at least one of the retaining element and the accumulator connected to the retaining element is hindered, and an unlocked position, in which the at least one of the retaining element and the accumulator is movable in the vertical direction; and
wherein the retaining device includes a second stop for engaging with a blocking element of the second side of the retaining element, so as to limit vertical movement, in the unlocked position, to end at the second stop.

16. The bicycle frame of claim 15, wherein the one of the tubes of the bicycle frame includes a cutout through which the accumulator is at least partially insertable into the interior of the respective tube, the retaining device being mounted on one end of the cutout, in the interior of the tube.

17. The bicycle frame of claim 16, wherein the one of the tubes is a top tube or a down tube, and the cutout is oriented downwardly toward a roadway when the bicycle frame is stood upright with wheels of the bicycle positioned on the roadway.

* * * * *